(12) United States Patent
Liu

(10) Patent No.: US 7,529,278 B2
(45) Date of Patent: May 5, 2009

(54) NONLINEAR POLARIZATION PULSE SHAPING MODEL LOCKED FIBER LASER AT ONE MICRON WITH PHOTONIC CRYSTAL (PC), PHOTONIC BANDGAP (PBG), OR HIGHER ORDER MODE (HOM) FIBER

(75) Inventor: Jian Liu, Sunnyvale, CA (US)

(73) Assignee: PolarOnyx, Inc., Sunnyvale, CA (US)

( * ) Notice: Subject to any disclaimer, the term of this patent is extended or adjusted under 35 U.S.C. 154(b) by 0 days.

(21) Appl. No.: 11/731,336

(22) Filed: Mar. 31, 2007

(65) Prior Publication Data

US 2007/0177641 A1 Aug. 2, 2007

Related U.S. Application Data

(63) Continuation-in-part of application No. 11/136,040, filed on May 23, 2005, now abandoned.

(60) Provisional application No. 60/788,226, filed on Mar. 31, 2006.

(51) Int. Cl.
*H01S 3/30* (2006.01)
*H01S 3/10* (2006.01)

(52) U.S. Cl. .................. 372/6; 372/22; 372/27

(58) Field of Classification Search .................. 372/6, 372/25, 22, 27
See application file for complete search history.

(56) References Cited

U.S. PATENT DOCUMENTS

| H001926 H | * | 12/2000 | Carruthers et al. | ............. 372/6 |
| 6,608,951 B1 | * | 8/2003 | Goldberg et al. | ............ 385/43 |
| 6,892,018 B2 | * | 5/2005 | Libori et al. | ............... 385/127 |
| 2003/0156605 A1 | * | 8/2003 | Richardson et al. | .......... 372/25 |

* cited by examiner

*Primary Examiner*—Minsun Harvey
*Assistant Examiner*—Patrick Stafford
(74) *Attorney, Agent, or Firm*—Xin Wen

(57) ABSTRACT

A fiber laser cavity that includes a laser gain medium for receiving an optical input projection from a laser pump, wherein the laser cavity further includes a normal dispersion fiber segment with a $\beta''>0$ where $\beta''$ representing a fiber dispersion, and an anomalous dispersion fiber segment with the $\beta''<0$ for generating a net anomalous dispersion for balancing a self-phase modulation (SPM) and a dispersion induced pulse broadening/compression in the fiber laser cavity for generating an output laser with a transform-limited pulse shape wherein the segment with the anomalous dispersion further includes a Photonic Crystal (PC), a Photonic Bandgap (PBG) or a higher order mode (HOM) fiber.

24 Claims, 6 Drawing Sheets

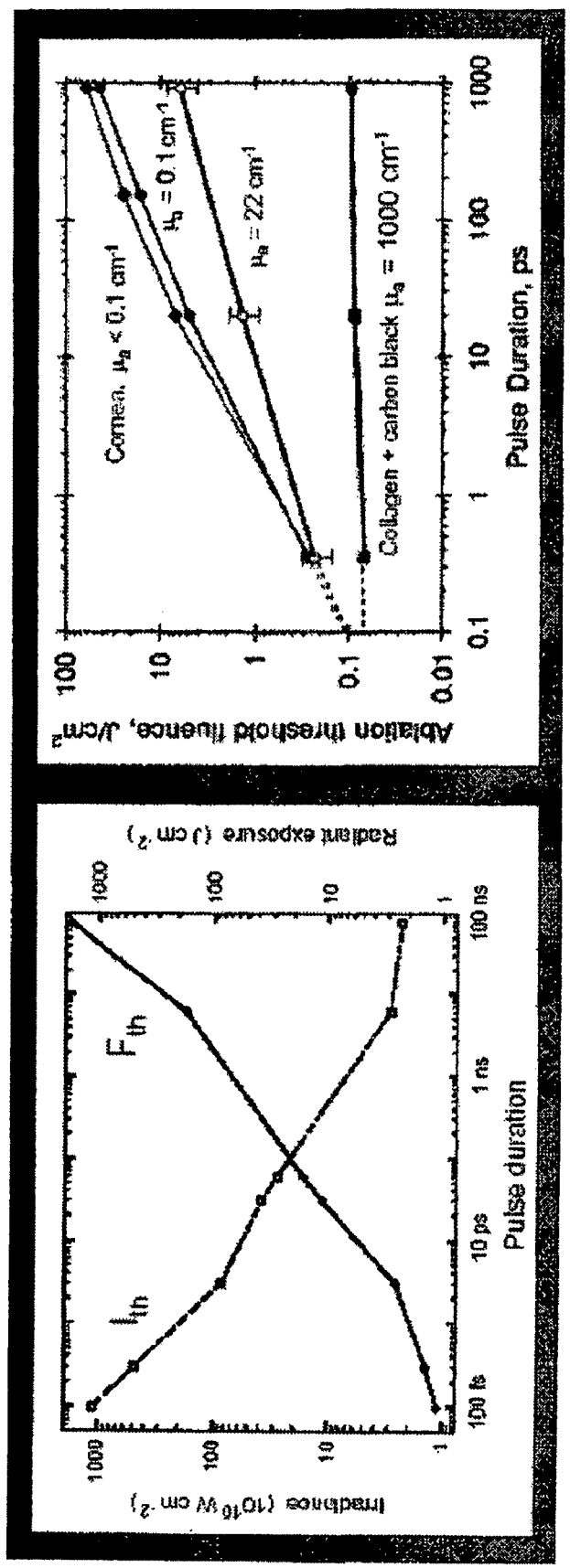
Figure 7 Damage threshold vs pulse duration

NONLINEAR POLARIZATION PULSE SHAPING MODEL LOCKED FIBER LASER AT ONE MICRON WITH PHOTONIC CRYSTAL (PC), PHOTONIC BANDGAP (PBG), OR HIGHER ORDER MODE (HOM) FIBER

This Formal Application claims a Priority Date of Mar. 31, 2006 benefited from a Provisional Application 60/788,226 filed by the same Applicant of this invention. This Formal Application is further a Continuation-in-part (CIP) of another patent application Ser. No. 11/136,040 filed on May 23, 2005 now abandoned by the same Applicant of this Patent Application. The disclosures made in the application Ser. No. 11/136,040 are hereby incorporated herein by reference.

FIELD OF THE INVENTION

The present invention relates generally to apparatuses and methods for providing short-pulsed mode-locked fiber laser. More particularly, this invention relates to new configurations and methods including the implementation of photonic crystal (PC) fiber, Photonic Band Gap (PBG) fiber, or a higher-order mode (HOM) fiber, for providing a nonlinear polarization pulse-shaping mode-locked fiber laser with improved and better controllable pulse shapes.

BACKGROUND OF THE INVENTION

Conventional technologies of generating short pulse mode-locked fiber laser are still confronted with technical difficulties and limitations that the practical applications of the ultra-short pulse and high power laser cannot be easily achieved. Specifically, the practical usefulness of the ultra-short high power lasers are often hindered by the pulse shapes distortions. Furthermore, such laser systems are often bulky, difficult for alignment maintenance, and also lack sufficient robustness. All these difficulties prevent practical applications of the ultra-short high power lasers.

Historically, generation of mode-locked laser with the pulse width down to a femtosecond level is a difficult task due to limited resources of saturation absorbers and anomalous dispersions of fibers. Conventionally, short pulse mode locked fiber lasers operated at wavelengths below 1.3 µm present a particular challenge is that there is no simple all fiber based solution for dispersion compensation in this wavelength regime. (For wavelengths above 1.3 µm, several types of fibers exist exhibiting either normal or anomalous dispersion, so by splicing different lengths of fibers together one can obtain a cavity with an adjustable dispersion.) Therefore, previous researchers use bulk devices, such as grating pairs and prisms to provide an adjustable amount of dispersion for the cavity. Unfortunately these devices require the coupling of the fiber into a bulk device, which results in a laser that is highly sensitive to alignment and thus the environment Several conventional techniques disclosed different semiconductor saturation absorbers to configure the ultra-short high power laser systems. However, such configurations often developed into bulky and less robust systems due to the implementations of free space optics. Such systems have been disclosed by S. N. Bagayev, S. V. Chepurov, V. M. Klementyev, S. A. Kuznetsov, V. S. Pivtsov, V. V. Pokasov, V. F. Zakharyash, *A femtosecond self-mode-locked Ti:sapphire laser with high stability of pulserepetition frequency and its applications* (Appl. Phys. B, 70, 375-378 (2000).), and Jones D. J., Diddams S. A., Ranka J. K., Stentz A., Windeler R. S., Hall J. L., Cundi® S. T., *Carrierenvelope phase control of femtosecond mode-locked laser and direct optical frequency synthesis.* (Science, vol. 288, pp. 635-639, 2000.). 70, 375-378 (2000).).

Subsequently, the stretched mode-locked fiber lasers are disclosed to further improve the generation of the short pulse high power lasers. However, even in the stretched mode locked fiber lasers, the free space optic components such as quarter wave retarder and splitters for collimating and coupling are implemented. Examples of these systems are described by John L. Hall, Jun Ye, Scott A. Diddams, Long-Sheng Ma, Steven T. Cundi®, and David J. Jones, in "*Ultrasensitive Spectroscopy, the Ultrastable Lasers, the Ultrafast Lasers, and the Seriously Nonlinear Fiber: A New Alliance for Physics and Metrology*" (IEEE JOURNAL OF QUANTUM ELECTRONICS, VOL. 37, NO. 12, DECEMBER 2001), and also by L. Hollberg, C. W. Oates, E. A. Curtis, E. N. Ivanov, S. A. Diddams, Th.Udem, H. G. Robinson, J. C. Bergquist, R. J. Rafac, W. M. Itano, R. E. Drullinger, and D. J. Wineland, in "Optical frequency standards and measurements" IEEE *J. Quant. Electon.* 37, 1502 (2001).

The limitations for practical application of such laser systems are even more pronounced due the pulse shape distortions when the pulse width is further reduced compounded with the requirement of high power fiber amplification. When the pulse width narrows down to femtosecond level and the peak power increases to over 10 kW, strong nonlinear effects such as self phase modulation (SPM) and XPM will cause more serious spectral and temporal broadening. These nonlinear effects and spectral and temporal broadening further causes a greater degree of distortions to the laser pulses. The technical difficulties cannot be easily resolved even though a large mode area (LMA) fiber can be used to reduce SBS and SRS to increase saturation power. However, the large mode area fiber when implemented will in turn cause a suppression of the peak power and leads to an undesirable results due to the reduction of the efficiency There is an urgent demand to resolve these technical difficulties as the broader applications and usefulness of the short pulse mode-locked are demonstrated for measurement of ultra-fast phenomena, micro machining, and biomedical applications. Different techniques are disclosed in attempt to resolve such difficulties. Such techniques include the applications of nonlinear polarization rotation (NLPR) or stretched mode locked fiber lasers as discussed above. As the NLPR deals with the time domain intensity dependent polarization rotation, the pulse shape distortions cannot be prevented due to the polarization evolution in both the time domain and the spectral domain. For these reasons, the conventional technologies do not provide an effective system configuration and method to provide effective ultra-short pulse high power laser systems for generating high power laser pulses with acceptable pulse shapes.

In addition to the above described difficulties, these laser systems require grating pairs for dispersion control in the laser cavity. Maintenance of alignment in such systems becomes a time consuming task thus prohibiting a system implemented with free space optics and grating pairs from practical applications. Also, the grating pairs further add to the size and weight of the laser devices and hinder the effort to miniaturize the devices implemented with such laser sources.

Therefore, a need still exists in the art of fiber laser design and manufacture to provide a new and improved configuration and method to provide ultra-short high power mode-locked fiber laser with better controllable pulse shapes such that the above discussed difficulty may be resolved.

SUMMARY OF THE PRESENT INVENTION

It is therefore an aspect of the present invention to provide a method of using nonlinear polarization evolution (NPE) and dispersion managed fiber cavity to manipulate the pulse propagation in the cavity and balance the self phase modulation (SPM) and dispersion induced pulse broadening/compressing. This method of polarization pulse shaping generates transform-limited pulse shapes through combinational effects of fiber length, the non-linear effects and dispersion such that the above-described difficulties encountered in the prior art can be resolved.

It is another aspect of this invention that by using Photonic crystal (PC), Photonic band gap (PBG) fiber, or a higher-order mode (HOM) fiber to achieve a mode locked fiber laser with 1 micron wavelength, because PC PBG and HOM fibers shows large dispersions, i.e., possibly over 100 ps/nm/km absolute value, in anomalous dispersions. This provides a solution for all fiber-based approach by eliminating gratings or prisms as negative dispersion components. Therefore, this invention provides a truly all fiber-based structure and that there is no requirements of any discrete free space component.

Briefly, in a preferred embodiment, the present invention discloses a fiber laser cavity comprising a laser gain medium for receiving an optical input projection from a laser pump. The fiber laser cavity further includes a normal dispersion fiber segment with a $\beta''>0$ where $\beta''$ representing a fiber dispersion, and an anomalous dispersion fiber segment with the $\beta''<0$ for generating a net anomalous dispersion for balancing a self-phase modulation (SPM) and a dispersion induced pulse broadening/compression in the fiber laser cavity for generating an output laser pulses wherein the segment with the anomalous dispersion further includes a Photonic Crystal (PC), a Photonic Bandgap (PBG) or a higher order mode (HOM) fiber. In an exemplary embodiment, the output laser includes a laser having a pulse width is compressed a pulse width equal or less than four hundred femtosecond (400 fs). In another exemplary embodiment, the fiber laser cavity constituting an all fiber laser cavity comprises no discrete free space components. In an exemplary embodiment, the HOM fiber further includes a pair of long period gratings (LPG). In an exemplary embodiment, the PBG fiber further includes a hollow core surrounded by a micro-structure cladding formed by a periodic arrangement of air holes in a silica for guiding a light therethrough. In an exemplary embodiment, the PC fiber further includes a solid silica core surrounded with a micro-structure cladding formed by a periodic arrangement of air holes in a silica for guiding a light therethrough. In an exemplary embodiment, the PBG fiber further includes a solid silica core surrounded by a micro-structure cladding formed by a periodic arrangement of higher refractive index Ge rods in a silica for guiding a light therethrough. In an exemplary embodiment, the fiber laser cavity having a net anomalous dispersion with the $\beta''<0$ for generating a laser with transform limited pulses. In an exemplary embodiment, the fiber laser cavity further has a net normal dispersion with the $\beta''>0$ for generating a laser with parabolic pulses. In an exemplary embodiment, the gain medium further includes a Ytterbium doped fiber for amplifying and compressing/stretching a laser pulse. In an exemplary embodiment, the fiber laser cavity further includes a polarization sensitive isolator and one or two polarization controllers for further shaping the optical pulse generation. In an exemplary embodiment, the polarization sensitive isolator further comprises a polarization sensitive core and an input and output collimators with fiber pigtails wherein the fiber pigtails includes non-PM fibers. In an exemplary embodiment, the gain medium further includes a Ytterbium doped fiber having a normal dispersion with the $\beta''>0$. In an exemplary embodiment, the gain medium further includes a Ytterbium doped PC fiber having a anomalous dispersion with the $\beta''<0$. In an exemplary embodiment, the laser cavity is an all fiber ring laser cavity includes no discrete free space components. In an exemplary embodiment, the laser cavity further includes an output coupler for transmitting a portion of a laser as the output laser from the fiber laser cavity. In an exemplary embodiment, the output laser includes a laser having a pulse width substantially compressed to equal or less than four hundred femtosecond (400 fs) and having a transform limited pulse shape. In an exemplary embodiment, the gain medium further includes a double cladding Ytterbium doped fiber (DCYDF).

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
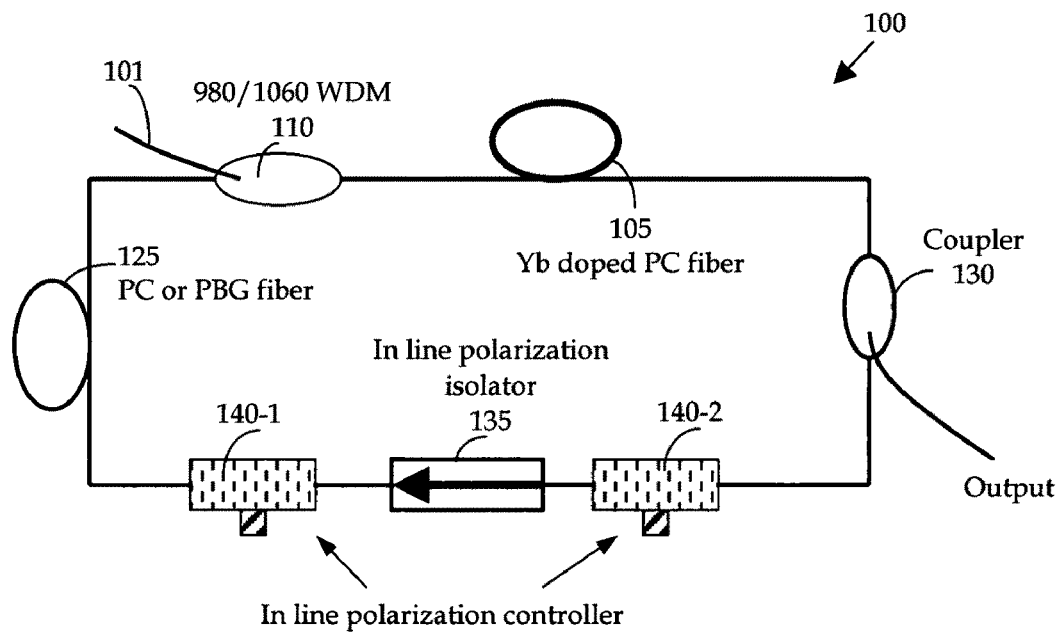
FIG. 1 is functional block diagram for an exemplary embodiment of an all fiber short-pulse mode-locked fiber laser of this invention that is implemented with Photonic Crystal (PC) or Photonic bandgap fiber with a Gain fiber implemented with a PC fiber.

FIG. 1 is a schematic diagram of an ultra compact and low cost all-fiber based high power femtosecond fiber laser system of this invention. This is a laser system formed with all fiber-based components. The fiber laser has a ring configuration receiving a laser input through wavelength de-multiplexing (WDM) device 110 of a source laser that may have ranges of wavelengths, e.g., 980 or 1550 nm. The all fiber-based laser 100 is implemented with a Yb doped fiber 105 as a gain medium to amplify and compress/stretch the pulse. The Yb gain fiber can be either PC fiber or regular single mode Yb doped fiber. A telecom grade 980 nm pump laser is used to pump Yb ions for amplification of the intra cavity pulses. To compensate the dispersion and dispersion slope in the fiber laser cavity, instead of using grating pairs or prisms, another photonic crystal fiber or PBG fiber 125 is employed. Because PC or PBG fibers 125 can provide both normal and anomalous dispersion at 1060 nm range with its uniquely structured properties and can also manipulate their dispersion slope, a fiber laser cavity can be designed with both dispersion and dispersion slope matched so the pulse can be narrowed to the maximum. In contrast to the prior art technologies, the system as shown in FIG. 1 considers polarization evolution in both time domain (intensity dependent) and spectral domain (wavelength dependent) in achieving ultra-short pulse<50 fs. The polarization filtering is achieved by managing both dispersion and dispersion slope and further by using fiber-based inline polarizing isolator and polarization controllers. The all fiber-based laser 100' employs an in-line polarization controller 140-1' and 140-2' before and after an in-line polarization sensitive isolator 135' that is implemented with single mode (SM) fiber pigtails. The in-line polarization sensitive control may be a product commercially provided by General Photonics, e.g., one of PolaRite family products. The polarizing isolator 135' has a high extinction ratio and only allows one linear polarization pass through over a wide spectrum. Due to nonlinear effects of SPM, the index of refraction will be dependent on the power intensity so that, in each individual pulse, high intensity peak will experience different intensity-induced birefringence with what low intensity wings will experience. When aligning the peak polarization with the polarizing isolator, only peak portion of the pulse can be transmitted and the wings portion will be blocked. Therefore, the pulse can be mode locked to femtosecond level by combining the polarization shaping and dispersion management.

Figure 2A:
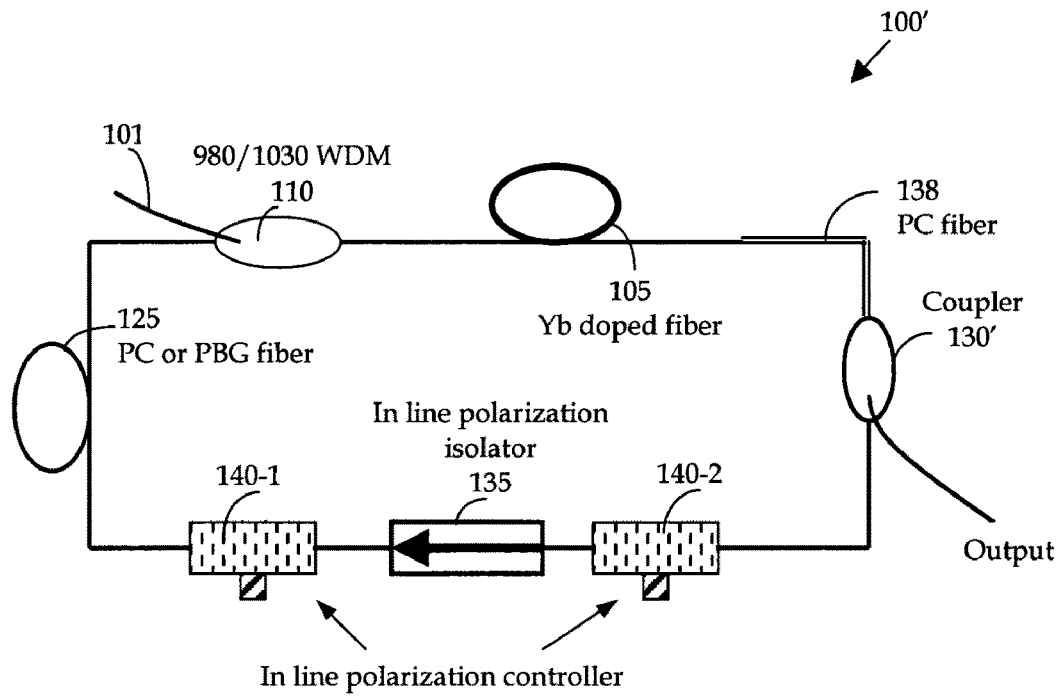
FIG. 2A is functional block diagram for an all fiber short-pulse mode-locked fiber laser implemented with Photonic Crystal (PC) fiber or Photonic bandgap fiber wherein the gain fiber is not a PC fiber.
Figure 2B:
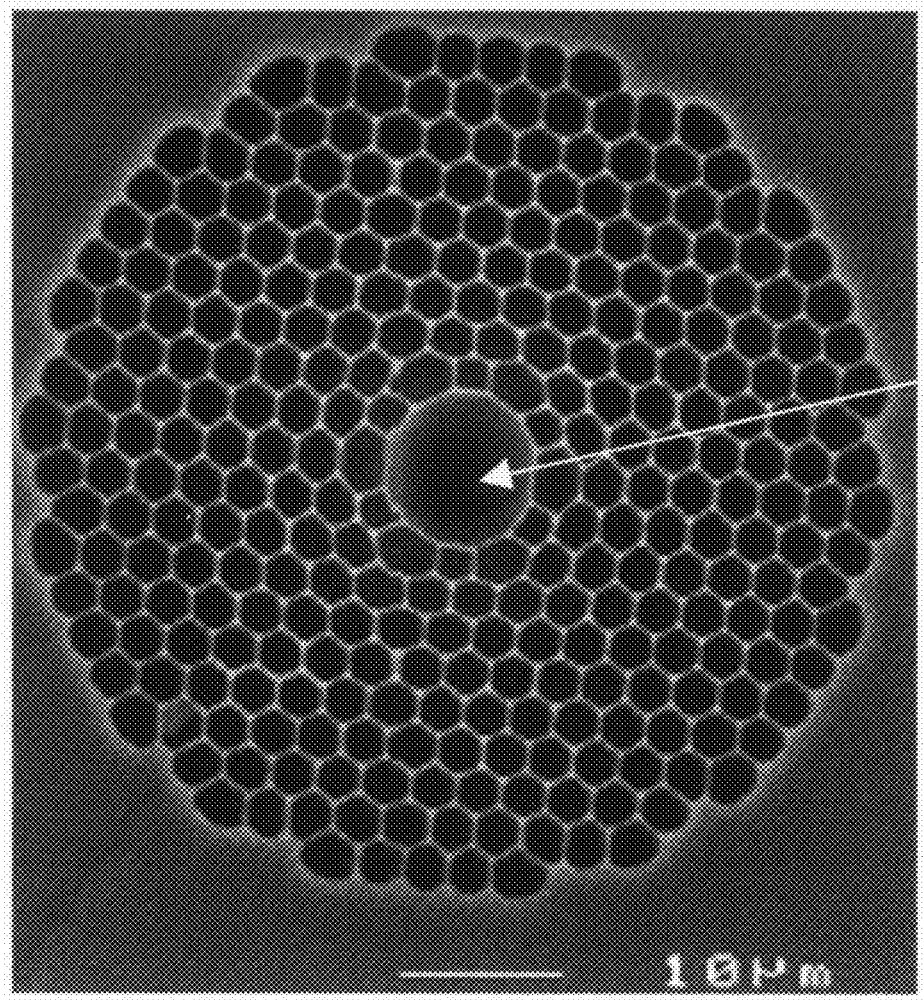
FIG. 2B is a cross sectional view of a Photonic Bandgap (PBG) fiber.

FIG. 2A shows an alternate all-fiber based high power femtosecond fiber laser system similar the all-fiber laser system shown in FIG. 1 with the exception of implementation of a Photonic crystal (PC) fiber 138 that is connected to the optical coupler 130'. By using either a Photonic crystal (PC) or a Photonic band gap (PGB) fiber, the mode locked fiber layer as shown in FIGS. 1 and 2 can achieve a one micro wavelength. The PC or PBG fibers as shown have large dispersions (possible can be made to be over 100 ps/nm/km in its absolute value) in anomalous dispersions. This provides a solution for all fiber-based approach by eliminating gratings or prisms as negative dispersion components. FIG. 2B shows a cross section of a Photonic Bandgap (PBG) fiber that guides the light in a hollow core surrounded by a micro-structure cladding formed by a periodic arrangement of air holes in silica.

FIGS. 1 and 2 demonstrate a truly "all-filer" configuration and the requirement of a discrete free space optical component is totally eliminated. The regular fiber such as SM28 or HI1060 has a normal dispersion, i.e., $\beta''>0$, a Photonic crystal (PC), a Photonic band gap (PGB) fiber, or a higher order mode (HOM) fiber implemented (as shown in FIG. 3A below) in the laser system provides an anomalous dispersion, i.e., $\beta''<0$, thus achieving a function of dispersion compensation.

Figure 3A:
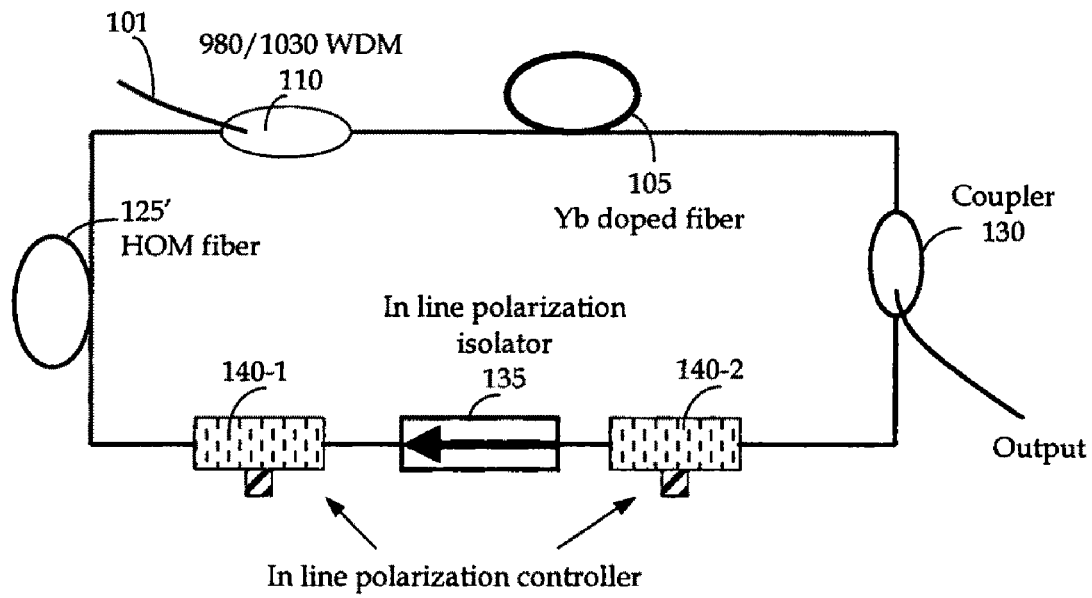
FIG. 3A is a functional block diagram of an alternate all fiber short-pulse mode-locked fiber laser implemented with HOM fiber.
Figure 3B:
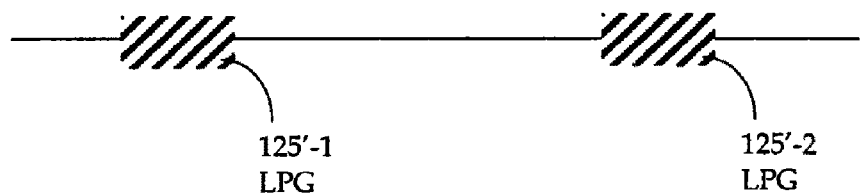
FIG. 3B shows the structure of a HOM fiber with long period gratings for providing an anomalous dispersion, i.e., $\beta''<0$.
Figure 3C:
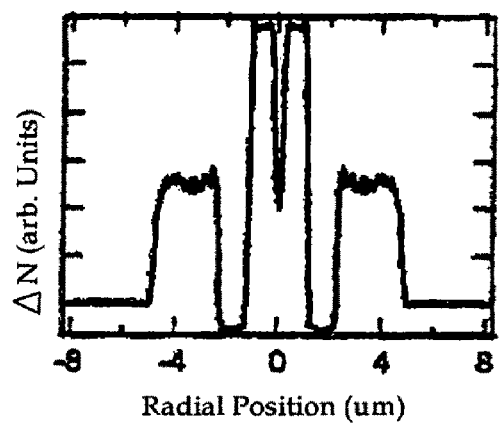
FIG. 3C shows an exemplary index profile of a HOM fiber.

FIG. 3A shows another exemplary embodiment of this invention as an all fiber based high power femtosecond fiber laser system similar the all-fiber laser system shown in FIG. 1 with the exception of implementation of a higher order mode (HOM) fiber 125' that is applied to provide an anomalous dispersion, i.e. $\beta''<0$, to compensate the normal dispersions. The HOM fiber is a solid silica-based fiber that has an anomalous dispersion as discussed by S. Ramachandran et al. in "Optical Letter, Vol. 31., NO. 17, published in Sep. 1, 2006". The HOM fiber is an all-solid silica-based index guided fiber that is able to achieve anomalous dispersion at a variety of wavelengths below 1300 nm where silica material dispersion is normal dispersion. FIG. 3B illustrates the structure of an exemplary embodiment of a HOM fiber, generating a index profile as that shown in FIG. 3C (index profile is for HOM), that includes two long period gratings for coupling the fundamental mode into high order mode and convert back into fundamental mode. Again, with HOM fiber 125'', the all fiber laser system as shown is able to achieve a dispersion compensation function thus a mode-locked laser is achieved.

The laser system as shown in FIGS. 1 to 3 have the advantages that it is alignment and maintenance free. It is much easier to handle the all-fiber based fiber laser and amplifiers than conventional mode locked solid state and/or fiber lasers. There are no alignment and realignment issues related. After the fibers and components are spliced together and packaged, there will be no need of specially trained technician for operation and maintenance, which reduce the cost and risk significantly in the field applications. Furthermore, it can be easily integrated with other module, such as fiber amplifiers, telescope/focusing system without extra optical alignment effort due to the flexibility of optical fiber. The laser system further takes advantage of the fully spectrum of the gain of the YDF and provides a high quality laser that is suitable for ablation processing the material. The laser system is implemented with all photonic crystal fibers for both the gain medium and transmission fibers in the cavity to compensate both the dispersions and dispersion slope. The photonic crystal (PC), PBG, HOM fiber shows novel properties in manipulating its structures such as hollow lattice shapes and filling factors to obtain both normal and anomalous dispersion below 1300 nm range. The PC fiber is used to compensate both dispersions and slope in the cavity and make short pulsed fiber laser by selecting various PC, PBG, HOM fibers.

Figure 4B:
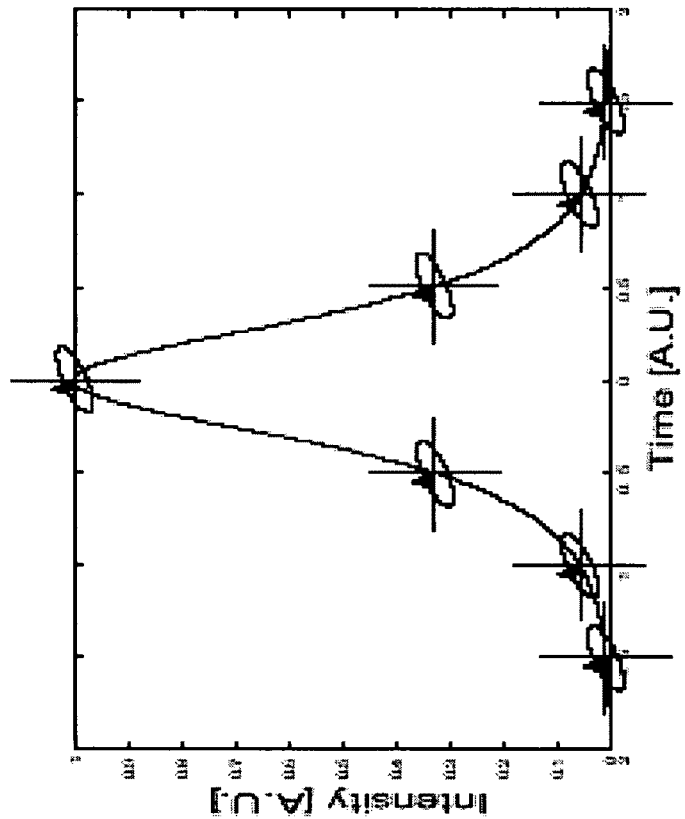
FIGS. 4A and 4B are waveforms for showing polarization changes as laser pulse transmitted over a laser cavity.
Figure 4A:
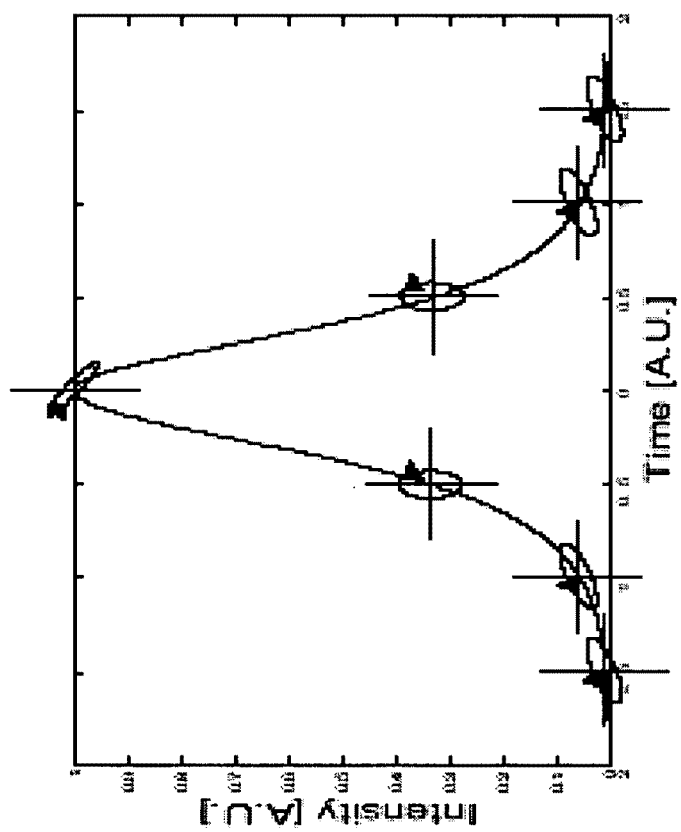

To further improve the performance of dispersion control, a special fiber is implemented by manipulating the filling factor of the air holes as that disclosed by V. Reichel, et al., in "Applications of pump multiplexed Yb-doped fiber lasers," SPIE 4974, 148 (2003). The structure was made by stacking silica capillaries into a hexagonal close packed structure and replacing a capillary at the center of the stack with a solid silica rod to form a solid fiber core. The air core will be formed in a similar way thus form a fiber generally known as photonic band gap-PBG fiber. FIGS. 4A and 4B show the SEM picture of a PCF and the dispersion and slope change vs. the hole sizes. It clearly shows that optimizing the photonic crystal fiber (PCF) structure; the dispersion can be flat over a spectral range over 200 nm. There is no possibility for the conventional fibers to achieve such performance.

A fiber exhibits a nonlinear birefringence that depends on the local intensities of the two orthogonally polarized field components. As a result, an elliptically polarized pulse will have two orthogonal components, i.e., x and y components. These two components experience different phase shifts, thus rotating the polarization ellipse. Since the phase shift is an intensity-dependent process, it rotates the polarization of a pulse at different amounts depending on the pulse's local intensity. FIGS. 4A and 4B show polarization's physical effect on a pulse. If the nonlinear effects are ignored and let FIG. 4A represent a uniformly polarized pulse launches into an isotropic optical fiber, a uniformly polarized output pulse is obtained as that depicted by FIG. 4B. Therefore, by launching the same pulse into the same fiber implemented with the effects of self phase modulation (SPM) and Cross phase modulation (XPM), an output similar to FIG. 4B can be generated. Examining FIG. 4B, it is noted that the low intensity wings are not affected, yet, as the pulse's intensity increases, a rotation of the polarization ellipse is observed. Therefore, a nonlinear phase evolution (NPE) induced by the nonlinear phase change of self-phase modulation (SPM) causes a polarization rotation, as the polarization is now pulse intensity dependent. Thus, the mode lock mechanism is caused by the SPM induced NPE. When the pulse passes through the polarization sensitive isolator that is controlled and adjusted by a polarization controller, only the highest intensity that lined up with the isolator will pass. The lower intensity part of the pulse is filtered out. Therefore, the pulse is well shaped and thus works as a saturation absorber (SA) to reduce the pulse width. The polarization controller 140 can be fiber based, or bulk optical quarter/half wave retarders, or a combination of both. The "polarization sensitive isolator and polarization controllers" works to select a polarization for the pulses, which have different polarization states in time domain.

Figure 5:
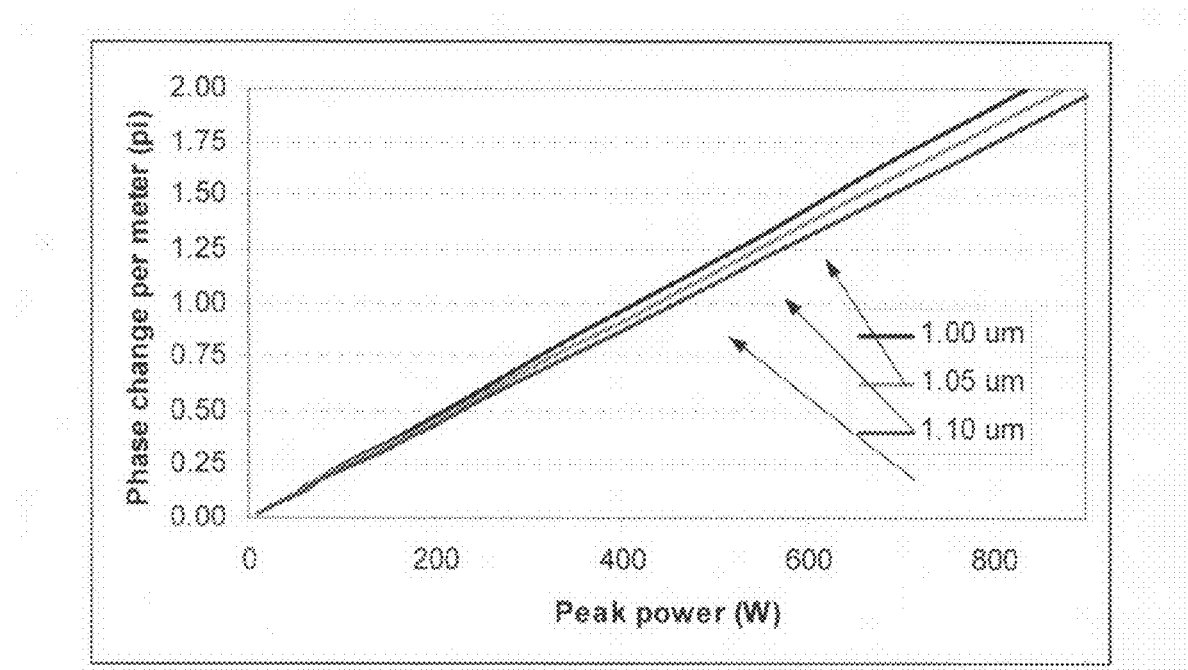
FIG. 5 is a diagram for showing an analysis result of phase change as a function of optical power.

When the pulse circulates in the fiber laser cavity, the laser pulse experiences the self-phase modulation (SPM) induced pulse broadening effects in both negative anomalous single mode fibers and positive normal dispersion fiber regions due to a high peak power and short pulse width (<ps). Moreover, in the region of positive dispersion, i.e., , $\beta''>0$, in the YDF 105, because the peak power is very high (>200 W for a 200 fs pulse), the nonlinear length and the dispersion length are comparable, i.e., ~1 m, in the YDF 105 segment. The pulse can be compressed by using the effects of both self phase modulation (SPM) and dispersion. An analysis is carried out to quantify the nonlinearity effects of the (SPM) phase change on a fiber with a mode field diameter of 10 micron. FIG. 5 shows the results of the analyses. According to FIG. 5, the phase (corresponding to the state of polarization) of the light is significantly dependent on the intensity of the light and the wavelength. At a given wavelength, 3 dB power change can generate 50% of the phase change. At a given power level, 10% wavelength change can generate same amount of phase change.

Since the gain of an Yb-doped fiber can cover over 100 nm from 1000 nm to 1100 nm, this gain medium enables the generation of a very short pulse less than 50 fs. However, because the polarization state is a function of wavelength (in proportional to $\Delta\lambda/\lambda$, in Yb fiber laser, it will be 10%), in spectral domain, different wavelength will experience different states of polarization. This will in turn affect the pulse width and quality. Moreover, even the dispersion management can be done in certain bandwidth, it can not cover the whole 100 nm bandwidth of the gain medium by using conventional fibers. For the purpose of generating ultra-short laser pulses, the dispersion slope compensation has to be taken into account. In conclusion, in order to take advantage of the maximum gain spectrum of the YDF, dispersion slope compensation is definitely required in combination with polarization compensation in spectral domain. A simulation analysis on a fiber with a mode field diameter of ten micrometers is performed to quantify the nonlinearity effects on the (SPM) phase change. FIG. 5 shows the simulation results with the phase of the light corresponding to the state of polarization that has a strong functional relationship and depends significantly on the intensity of the light and the wavelength. At a given wavelength, 3 dB power change can generate 50% of the phase change. At a given power level, a change of 10% in wavelength can generate same amount of phase change.

Figure 6:
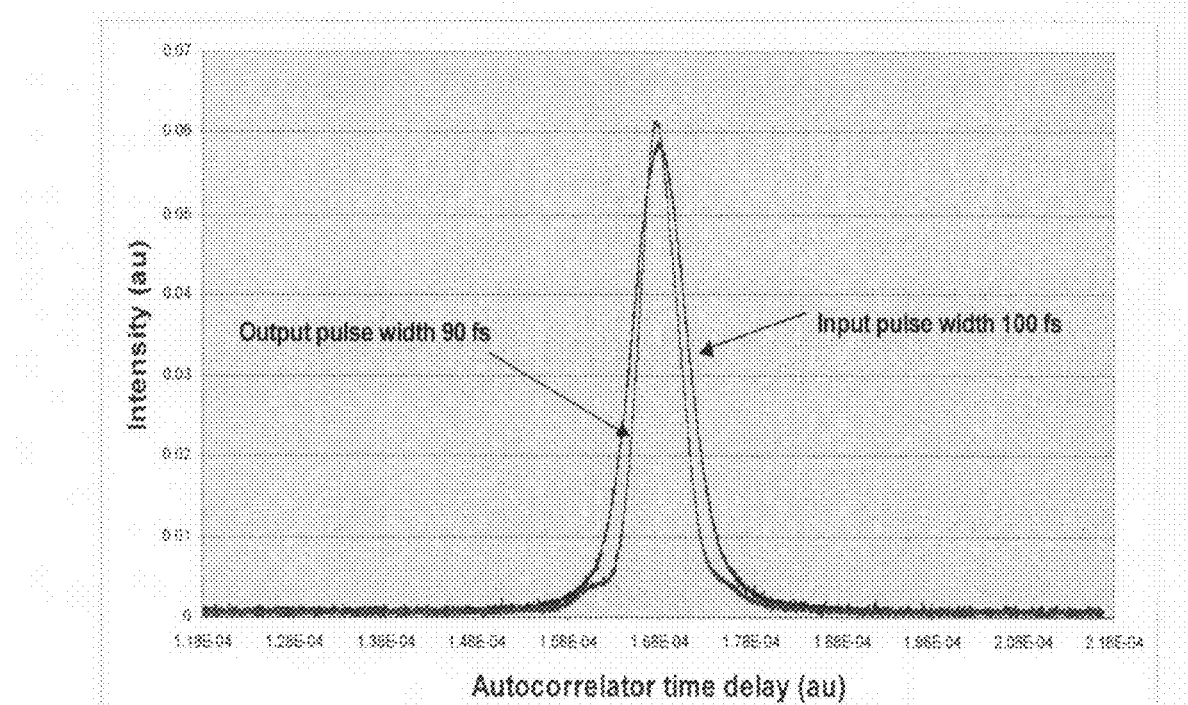
FIG. 6 shows the damage threshold versus the laser pulse width for application to material ablation processes.

The ultra-short pulse lasers disclosed in this invention when combine with high power fiber amplifiers, further provide an enabling technology for fine material processing and nano-structure fabrication. Particularly, the short pulse lasers disclosed in this invention can be a vital tool for future research and development in the semiconductor, biomedical, and a wide variety of technical fields. FIG. 6 shows the drop of damage threshold by a factor of 1000 when the pulse width of optical projection applied for semiconductor manufactures is reduced from 100 ns to 100 fs. The short pulse optical projection provides the ability of processing the fine structures because in such processes, it is critical that the processes can be carried out without causing any damage to the neighbored structures. It has been demonstrated that for application to nano-structure fabrications, a fs pulse is able to produce significantly smooth and round shape structures with less burning than that are accomplished by an ns pulse. Particularly for biomedical, semiconductor and other nano-structure processing and manufacturing applications, the all fiber system as disclosed in this invention is much more preferable when compared to the bulky solid state systems as such system would be difficult to integrate into different kinds of modern applications including the semiconductor manufacturing facilities. The compact all-fiber lasers with ultra-short pulses disclosed in this invention provide a solution for such applications.

According to above descriptions and drawings, this invention further discloses a method for generating an output laser from a laser cavity comprising a laser gain medium by projecting an input laser from a laser pump into said fiber laser cavity for amplifying and compacting a laser pulse in said gain medium. The method includes a step of forming the laser cavity by employing a normal dispersion fiber segment with a $\beta''>0$ where $\beta''$ representing a fiber dispersion and an anomalous dispersion fiber segment with a $\beta''<0$ for generating a net negative dispersion by using a Photonic Crystal (PC), a Photonic Bandgap (PBG) or a higher order mode (HOM) fiber to balance a dispersion induced compression/stretching and a self-phase modulation (SPM) in the fiber laser cavity for generating the mode locked ultrafast optical pulses. In an exemplary embodiment, the method further includes a step of generating the output laser with a pulse width substantially compressible to equal or less than four hundred femtosecond (400 fs). In another exemplary embodiment, the method further includes a step of configuring the fiber laser cavity as an all fiber laser cavity with no discrete free space components. In another exemplary embodiment, the step of using the HOM fiber further includes a step of using the HOM fiber with a pair of long period gratings (LPG). In another exemplary embodiment, the step of using the PBG fiber further includes a step of using the PBG with a hollow core surrounded by a micro-structure cladding formed by a periodic arrangement of air holes in a silica for guiding a light therethrough. In another exemplary embodiment, the step of using the PBG fiber further includes a step of using the PBG with a solid silica core surrounded by a micro-structure cladding formed by a periodic arrangement of higher refractive index Ge rods in a silica for guiding a light therethrough. In another exemplary embodiment, the step of using the PC fiber further includes a step of using the PC with a solid silica core surrounded with a micro-structure cladding formed by a periodic arrangement of air holes in a silica for guiding a light therethrough.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A mode-lock fiber laser, comprising:
an input coupler configured to couple pump light into a fiber laser cavity;

a fiber-based gain medium in the fiber laser cavity, the fiber-based gain medium configured to amplify signal laser pulses in response to the pump light, wherein the signal laser pulses each has a peak portion having a peak polarization and a wing portion having a wing polarization different from the peak polarization;

a normal (positive) dispersion fiber in the fiber laser cavity, the normal dispersion fiber configured to guide signal laser pulses therethrough;

an anomalous (negative) dispersion fiber in the fiber laser cavity, the anomalous dispersion fiber configured to guide signal laser pulses therethrough, wherein the anomalous dispersion fiber is formed by a fiber selected from a group consisting of a Photonic Crystal (PC), a Photonic Bandgap (PBG), and a higher order mode (HOM) fiber, wherein the anomalous dispersion fiber compensates the normal dispersion fiber to produce a net anomalous dispersion; and a first fiber-based polarization controller configured to align the peak polarizations of the signal laser pulses along a first polarization direction;

a polarization isolator configured to receive the signal laser pulses from the first fiber-based polarization controller, and to uni-directionally pass the peak portions of the signal laser pulses having the peak polarizations aligned along the first polarization direction, wherein the polarization isolator is configured to block at least portions of the wing portions in the signal laser pulses;

a second fiber-based polarization controller configured to control the peak polarization of the signal laser pulses received from the polarization isolator to produce mode locking, wherein the polarization isolator is positioned between the first fiber-based polarization controller and the second fiber-based polarization controller; and an output coupler configured to direct a portion of the signal laser pulses as output laser pulses out of the fiber laser cavity.

2. The mode-lock fiber laser of claim 1, wherein the output laser pulses have a pulse width equal to or less than 400 femtosecond.

3. The mode-lock fiber laser of claim 1, wherein the fiber laser cavity does not comprise a discrete free space component.

4. The mode-lock fiber laser of claim 1, wherein the HOM fiber comprises a pair of fiber-based long period gratings (LPGs).

5. The mode-lock fiber laser of claim 1, wherein the PBG fiber comprises:
 a silica base;
 a hollow core; and
 a micro-structure cladding surrounding the hollow core, wherein the micro-structure cladding comprises a periodic distribution of air holes configured to guide the signal laser pulses therethrough.

6. The mode-lock fiber laser of claim 1, wherein the PC fiber comprises:
 a solid silica core; and
 a micro-structure cladding surrounding the solid silica core, wherein the micro-structure cladding comprises a periodic distribution of air holes configured to guide the signal laser pulses therethrough.

7. The mode-lock fiber laser of claim 1, wherein the PBG fiber comprises:
 a solid silica core; and
 a micro-structure cladding surrounding the solid silica core, wherein the micro-structure cladding comprises a periodic distribution of higher refractive index Ge rods configured to guide the signal laser pulses therethrough.

8. The mode-lock fiber laser of claim 1, wherein the fiber laser cavity has a net anomalous total dispersion for the signal laser pulses.

9. The mode-lock fiber laser of claim 1, wherein the fiber laser cavity has a net normal total dispersion for the signal laser pulses.

10. The mode-lock fiber laser of claim 1, wherein the fiber-based gain medium comprises a Ytterbium doped fiber configured to amplify the signal laser pulses.

11. The mode-lock fiber laser of claim 10, wherein the fiber-based gain medium comprises a double cladding Ytterbium doped fiber.

12. The mode-lock fiber laser of claim 10, wherein the fiber-based gain medium is further configured to compress or stretch the signal laser pulses.

13. The mode-lock fiber laser of claim 1, wherein the fiber-based gain medium has a normal dispersion.

14. The mode-lock fiber laser of claim 1, wherein the fiber-based gain medium has an anomalous dispersion.

15. The mode-lock fiber laser of claim 1, wherein the fiber laser cavity forms a ring-shaped laser cavity.

16. A mode-lock fiber laser, comprising:
 an input coupler configured to couple pump light into a fiber laser cavity;
 a fiber-based gain medium in the fiber laser cavity, the fiber-based gain medium configured to amplify signal laser pulses in response to the pump light, wherein the signal laser pulses each has a peak portion having a peak polarization and a wing portion having a wing polarization different from the peak polarization;
 a normal (positive) dispersion fiber in the fiber laser cavity, the normal dispersion fiber configured to guide signal laser pulses therethrough;
 an anomalous (negative) dispersion fiber in the fiber laser cavity, the anomalous dispersion fiber configured to guide signal laser pulses therethrough;
 a first fiber-based polarization controller configured to align the peak polarizations of the signal laser pulses along a first polarization direction;
 a polarization isolator configured to receive the signal laser pulses from the first fiber-based polarization controller, and to uni-directionally pass the peak portions of the signal laser pulses having the peak polarizations aligned along the first polarization direction, wherein the polarization isolator is configured to block at least portions of the wing portions in the signal laser pulses;
 a second fiber-based polarization controller configured to control the peak polarization of the signal laser pulses received from the polarization isolator to produce mode locking, wherein the polarization isolator is positioned between the first fiber-based polarization controller and the second fiber-based polarization controller; and
 an output coupler configured to direct a portion of the signal laser pulses as output laser pulses out of the fiber laser cavity.

17. The mode-lock fiber laser of claim 16, wherein the polarization isolator is fiber based, the polarization isolator comprising:
 a polarization sensitive fiber core; and
 a fiber pigtail comprising a non-PM fiber configured to collimate the signal laser pulses.

18. The mode-lock fiber laser of claim 16, wherein the first fiber-based polarization controller, the second fiber-based polarization controller, and the polarization isolator are configured to produce mode locking in the peak portions of the signal laser pulses in the laser cavity.

19. The mode-lock fiber laser of claim 16, wherein the first fiber-based polarization controller, the second fiber-based polarization controller, and the polarization isolator are configured to shape the signal laser pulses.

20. The mode-lock fiber laser of claim 16, wherein the first fiber-based polarization controller, the second fiber-based polarization controller, and the polarization isolator are configured to narrow the signal laser pulses.

21. The mode-lock fiber laser of claim 16, wherein the output laser pulses have a pulse width equal to or less than 400 femtosecond.

22. The mode-lock fiber laser of claim 16, wherein the fiber laser cavity has a net anomalous total dispersion for the signal laser pulses.

23. The mode-lock fiber laser of claim 16, wherein the fiber laser cavity has a net normal total dispersion for the signal laser pulses.

24. The mode-lock fiber laser of claim 16, wherein the fiber laser cavity does not comprise a discrete free space component.

* * * * *